United States Patent
McLennan et al.

(10) Patent No.: US 9,103,353 B2
(45) Date of Patent: Aug. 11, 2015

(54) RADIATOR MODULE FOR MOTOR VEHICLE

(75) Inventors: Paul McLennan, London (CA); Robert Jones, London (CA)

(73) Assignee: MAGNA Electronics Europe GmbH & Co. KG, Sailauf (DE)

( * ) Notice: Subject to any disclaimer, the term of this patent is extended or adjusted under 35 U.S.C. 154(b) by 576 days.

(21) Appl. No.: 13/501,871

(22) PCT Filed: Oct. 21, 2010

(86) PCT No.: PCT/DE2010/001222
§ 371 (c)(1),
(2), (4) Date: Apr. 13, 2012

(87) PCT Pub. No.: WO2011/047666
PCT Pub. Date: Apr. 28, 2011

(65) Prior Publication Data
US 2012/0206000 A1   Aug. 16, 2012

(30) Foreign Application Priority Data
Oct. 22, 2009   (DE) .......................... 10 2009 050 370

(51) Int. Cl.
*F04D 29/64* (2006.01)
*H02K 5/02* (2006.01)
*H02K 5/10* (2006.01)
(Continued)

(52) U.S. Cl.
CPC .............. *F04D 29/646* (2013.01); *F04D 25/06* (2013.01); *F04D 29/601* (2013.01); *H02K 5/02* (2013.01); *H02K 5/10* (2013.01); *H02K 5/15* (2013.01);
(Continued)

(58) Field of Classification Search
CPC ......... H02K 5/1732; H02K 5/15; H02K 5/10; H02K 5/02; H02K 5/00; H02K 5/06; H02K 7/14
USPC ...................................................... 310/89, 91
See application file for complete search history.

(56) References Cited

U.S. PATENT DOCUMENTS 6,376,950 B1 * 4/2002 Varney et al. ................... 310/89
7,541,701 B2 * 6/2009 Lin et al. ......................... 310/58

(Continued)

FOREIGN PATENT DOCUMENTS

| DE | 60019186 T2 | 9/2005 |
| DE | 102004005028 A1 | 9/2005 |
| DE | 60206664 T2 | 7/2006 |
| WO | WO 2005073660 A1 * | 8/2005 |

OTHER PUBLICATIONS

WO 2005073660 A1 machine translation Mar. 19, 2015.*

*Primary Examiner* — Joshua Benitez-Rosario
*Assistant Examiner* — Leda Pham
(74) *Attorney, Agent, or Firm* — Jordan IP Law, LLC; Todd A. Vaughn

(57) ABSTRACT

In a radiator module for a motor vehicle, a detachable connection is required between a housing of an electric motor and a retaining structure, which connection allows economic and secure assembly and cannot be loosened or detached by alternating reaction forces at the electric motor. To achieve this, an arrangement is proposed of a retaining structure and detachably connected therewith a housing for an electric motor, in which the housing has a number of radiating protruding tabs on the base side which can be inserted by successive tilt and shift movements in corresponding recesses of the retaining structure. Furthermore various methods for assembly are proposed.

14 Claims, 4 Drawing Sheets

(51) Int. Cl.
*H02K 5/15* (2006.01)
*H02K 5/173* (2006.01)
*F04D 25/06* (2006.01)
*F04D 29/60* (2006.01)

(52) U.S. Cl.
CPC ......... *H02K 5/1732* (2013.01); *Y10T 29/49009* (2015.01)

(56) References Cited

U.S. PATENT DOCUMENTS

2007/0024135 A1* 2/2007 Simofi-Ilyes et al. .......... 310/89
2007/0222310 A1* 9/2007 Drexlmaier ..................... 310/51
2009/0115273 A1* 5/2009 Chen et al. ...................... 310/88

* cited by examiner

RADIATOR MODULE FOR MOTOR VEHICLE

CROSS-REFERENCE TO RELATED APPLICATIONS

The present application is a National Stage Application of PCI International Application No. PCT/DE2010/001222 (filed on Oct. 21, 2010), under 35 U.S.C. §371, which claims priority to German Patent Application No. 10 2009 050 370.6 (filed on Oct. 22, 2009), which are each hereby incorporated by reference in their respective entireties.

FIELD OF THE INVENTION

The present invention concerns a connection between an electric motor and a holder and in particular the design of a detachable connection between an electric motor of a radiator fan and a retaining structure of a radiator module on a motor vehicle. Furthermore, the present invention concerns a method for assembly of a radiator module with an electric motor and a retaining structure.

BACKGROUND OF THE INVENTION

U.S. Pat. No. 7,318,394 B2 shows a radiator arrangement or a radiator module for a motor vehicle with a fan and a heat exchanger. The fan comprises an electric motor with an impeller wheel mounted axially on the shaft. A retaining structure is provided to hold the electric motor in a pre-specified position on the heat exchanger. Also disclosed is various conventional designs of the connection between the housing of the electric motor and the retaining structure. This connection has particular importance in view of the cost of installation of the radiator arrangement. Connections with as few as possible bolts or other fixing elements of complicated fit require fewer manual measures and reduce the assembly costs. The connections described therein document essentially achieve this by catch, snap catch or twist lock connections which are created by insertion of the electric motor in the receiving point with or without additional twisting. However with the conventional connections described, the disadvantage remains that the forces acting on the electric motor can loosen or release the connection.

SUMMARY OF THE INVENTION

The present invention is therefore based on the object of creating a detachable connection between a housing of an electric motor and a retaining structure, which connection cannot be loosened or detached by alternating reaction forces.

In a second aspect the invention faces the object of providing a method for installing an electric motor in a retaining structure of a radiator arrangement, which method creates a detachable connection reliably unaffected by reaction forces.

With regard to the device, the present invention achieves this object by an arrangement with the features of a retaining structure and detachably connected therewith a housing for an electric motor, wherein the housing has a number of radiating protruding tabs on the base which can be inserted by successive tilt and shift movements into corresponding recesses of the retaining structure. Furthermore the present invention achieves this object with various assembly methods.

Advantageous embodiments and refinements of the present invention are given in the subclaims.

BRIEF DESCRIPTION OF THE DRAWINGS

The invention is described below with reference to embodiment examples shown in the drawings, which show.

DETAILED DESCRIPTION OF EMBODIMENTS

Figure 1:
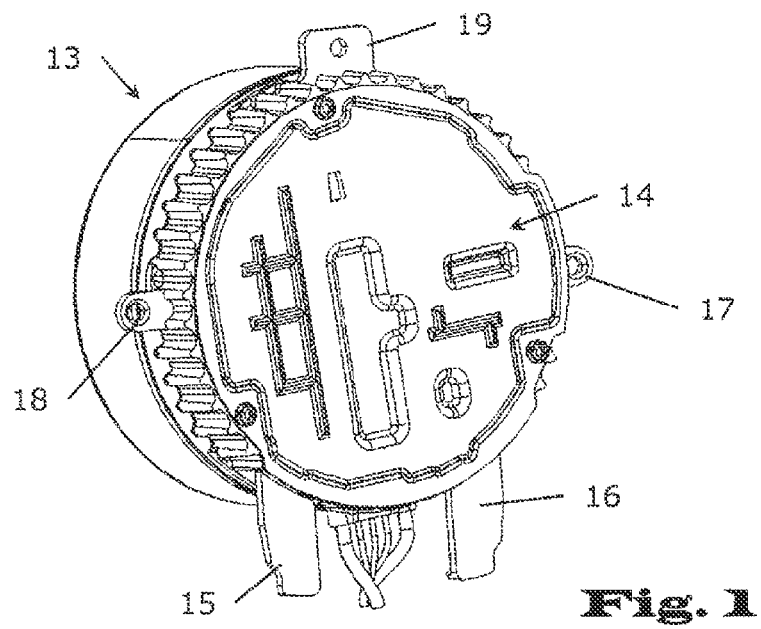
FIG. 1 is a schematic simplified perspective view of a first preferred embodiment of an electric motor for a radiator fan from behind.
Figure 2:
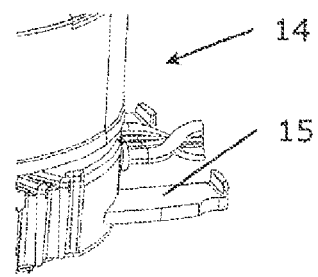
FIG. 2 is a schematic simplified perspective detailed view of the base tabs on the housing of the electric motor of FIG. 1.
Figure 3:
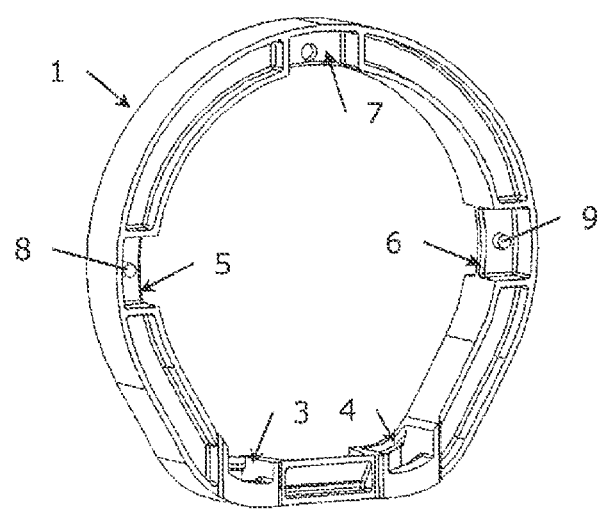
FIG. 3 is a schematic simplified perspective view of part of a first preferred embodiment of a retaining structure in a vehicle radiator in the region of the holder for the housing of the electric motor of FIG. 1.
Figure 4:
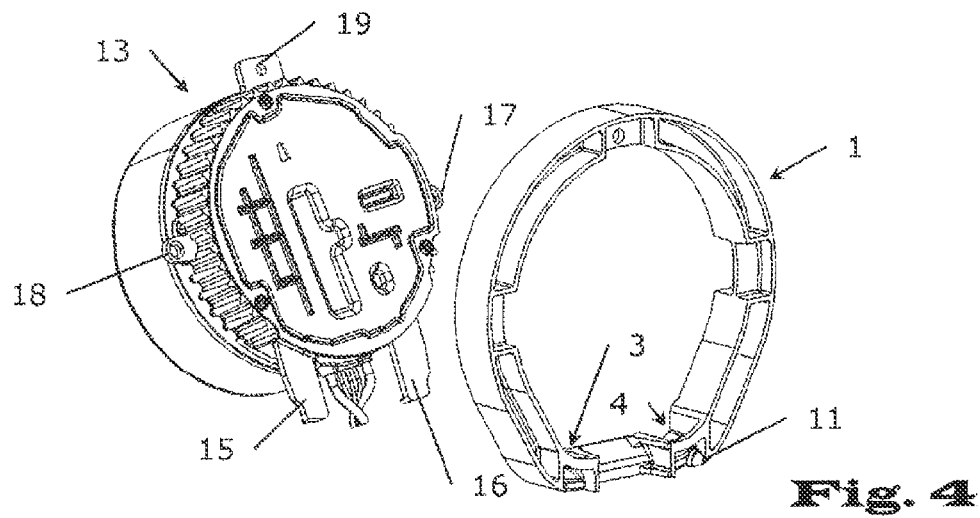
FIG. 4 is a schematic simplified perspective view of a step in the installation of the electric motor of FIG. 1 in the retaining structure of FIG. 2.
Figure 5:
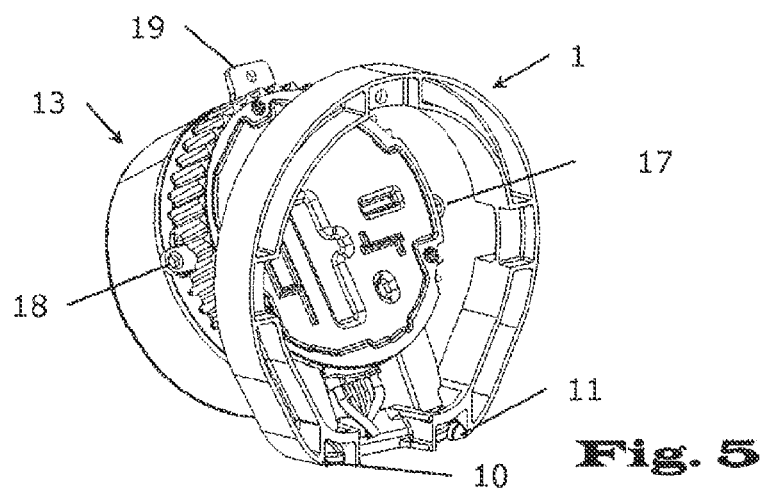
FIG. 5 is a schematic simplified perspective view of a step following the step of FIG. 4 in the installation of the electric motor of FIG. 1 in the retaining structure of FIG. 2.
Figure 6:
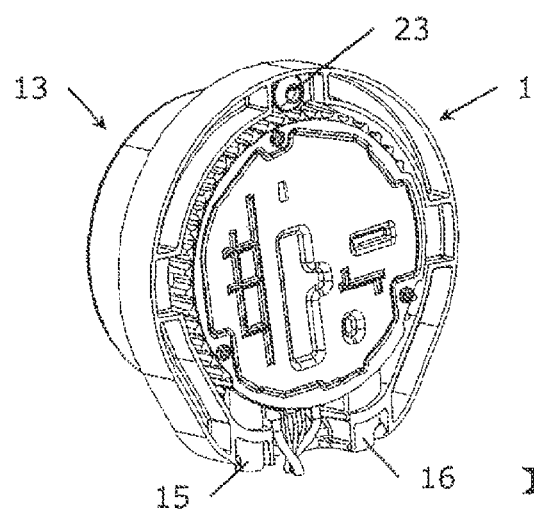
FIG. 6 is a schematic simplified perspective view of a step following the step of FIG. 5 in the installation of the electric motor of FIG. 1 in the retaining structure of FIG. 2.

In accordance with FIGS. 1 to 6, a first preferred embodiment of an arrangement in accordance with the invention includes a retaining structure 1 and detachably connected therewith a housing 14 of an electric motor 13. The housing 14 shown here is a flat, semi-open, approximately cylindrical housing as typical of internal pole motors and electronically commutated motors with fixed internal winding frequently used in radiator fans. The housing 14 on the base side, i.e. opposite the output side, has a number of radiating protruding tabs 15, 16, 17, 18, 19. The term radiating in the present case designates merely the circumstances that various tabs distributed over the periphery protrude from the outer surface. Tabs 15, 16, 17, 18, 19 need not necessarily be evenly distributed over the entire angular region, be symmetrically designed or oriented radially. The first arrangement mentioned has five tabs 15, 16, 17, 18, 19.

Two first tabs 15, 16 are close together and arranged protruding approximately parallel about a radial direction in order to be inserted into corresponding pocket-like recesses 3, 4 of the retaining structure 1 in a direction running transverse to the motor axis A. The raised edges at the ends, in particular in accordance with FIG. 2, ensure a particularly safe seat. Three further tabs 17, 18, 19 are distributed along the periphery. Here one of these tabs 1.9 lies opposite the first pair of tabs 15, 16, the other two tabs 17, 18 are arranged opposite each other, each offset by approximately one quarter of a circle to the left and right. The further tabs 17, 18, 19 have a flat form which allows insertion in flatly lowered recesses 5, 6, 7 in the direction of the motor axis A.

Tabs 17, 18 includes means for preventing, after insertion in the corresponding recesses 3, 4, a shift of the housing 2 against the retaining structure 1 in the plane of the contact surface of tabs 15, 16, 17, 18, 19. Instead of the peg-hole fits 8, 9 shown in the drawing, naturally with equal success a fit along the outer contour of tabs 17, 18 can be considered.

In the first embodiment described above, with few actions a mechanically strong but still detachable connection can be created between the housing 14 and the retaining structure 1. For this the housing 14, in a position tilted in relation to the installation position, is first inserted with the pair of first tabs 15, 16 into the corresponding pocket-like recesses 3, 4 of the retaining structure 1. Preferably as shown in the respective drawings, suitable stops 10, 11 limit the insertion depth. From this position, the housing 14 is oriented into the installation position, whereby the further tabs 17, 18, 19 become fully immersed in the corresponding flatly lowered recesses 5, 6, 7 provided. The peg-hole fits at tabs 17, 18 cause a locking of the housing 2 against a further shift in the plane of the base. After insertion of a fixing means and preferably a screw 23 at one of the further tabs 19, a tilting necessary for detaching the housing 14 from the holder is prevented. Screw 23 here transmits only slight forces of the tilt moment provoked by the weight of the electric motor 13. The essential reaction forces are transmitted by tabs 15, 16, 17, 18, 19 to recesses 3, 4, 5, 6, 7.

A second preferred embodiment of the present invention not shown in the drawings is obtained by a slight change to the first embodiment described above in relation to the shape of the tabs and recesses. Here firstly the pocket-like recesses on the top are cut away. This gives a reduced movement of the housing for insertion of the respective first tabs which are also designed straight at their ends. The peg-hole fits provided in the first preferred embodiment between the further side tabs and the corresponding recesses are furthermore converted into peg-slot fits which allow a slight movement. The recess belonging to the further tab lying opposite the first tabs finally has a small shoulder. This is dimensioned in relation to the tab such that when the first tabs are fully inserted in the opposing recesses, it no longer makes contact with the outer edge of the tab. As a result a shift between housing and retaining structure in the fully oriented position of the electric motor is prevented. Again a small screw is provided to prevent the electric motor from tilting back out of the installation position.

Figure 7:
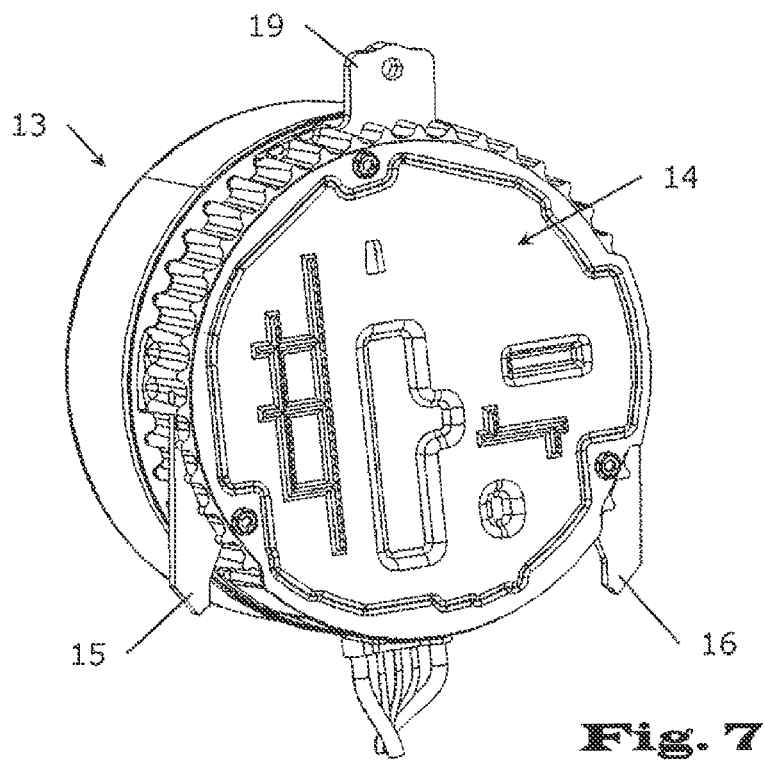
FIG. 7 is a schematic simplified perspective view of a third preferred embodiment of an electric motor for a radiator fiat from the back.
Figure 8:
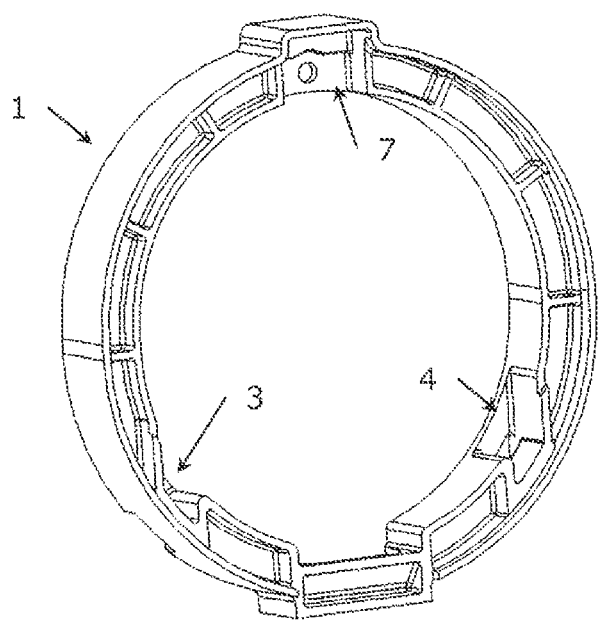
FIG. 8 is a schematic simplified perspective view of part of a third preferred embodiment of a retaining structure in a vehicle radiator in the region of the holder for the housing of the electric motor of FIG. 7.

A third preferred embodiment of the present invention similar to the second preferred embodiment is illustrated in FIGS. 7 and 8. This third embodiment has a total of just three tabs 15, 16, 19. The two symmetrically arranged tabs 15, 16 pointing downward correspond to the first tabs in the first and second embodiments described. The function of the tab opposite these tabs is performed by the third tab 19 in the third embodiment. The pocket-like recesses 3, 4 corresponding to the symmetrically arranged tabs 15, 16, as illustrated in FIG. 8 and like in the second embodiment described, are lowered or cut away in the direction of assembly and allow a slightly offset insertion from the front. Via the third tab 19, in the installation position, in the third embodiment again the housing 14 is blocked against shifting by a step inside the corresponding recess. Again a screw 23 secures the housing 14 against tipping back out of the installation position.

Installation of the electric motor 13 in the retaining structure 1 is completed by the steps described below for the second and third embodiments described. First the electric motor 13 is brought out of an eccentric position, slightly tilted in relation to its operating position, to the retaining structure 1 in the direction of the motor axis A. Here the first tabs 15, 16 come to rest in the lowered region of the corresponding recesses 3, 4. Tab 19 and any further tabs in this situation still lie incompletely in the corresponding flatly lowered recesses. The tab 19 opposite the first tabs 15, 16 from above meets against the step in the recess 7. In this position, the housing 14 can be shifted slightly in the direction of the first tabs 15, 16. These are then completely immersed in the pocket-like recesses 3, 4 and engage behind the bow-shaped sections. Suitably designed stops again limit the insertion depth and ensure a central orientation of the first tabs 15, 16. In the hilly inserted position, the protruding edge of the tab 19 opposite the first tabs 15, 16 lies next to the step. As a result the housing 14 can be tilted into its installation position. After fitting the screw 22, tilting back is prevented.

Figure 9:
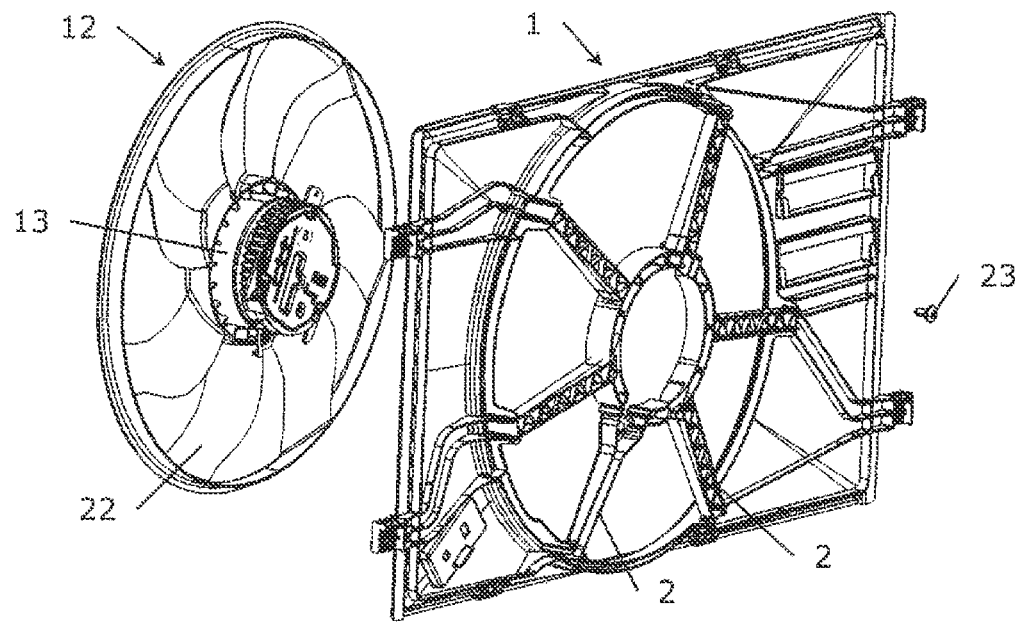
FIG. 9 is a schematic simplified perspective overall view of the electric motor with mounted impeller wheel and the retaining structure in the third preferred embodiment before assembly.
Figure 10:
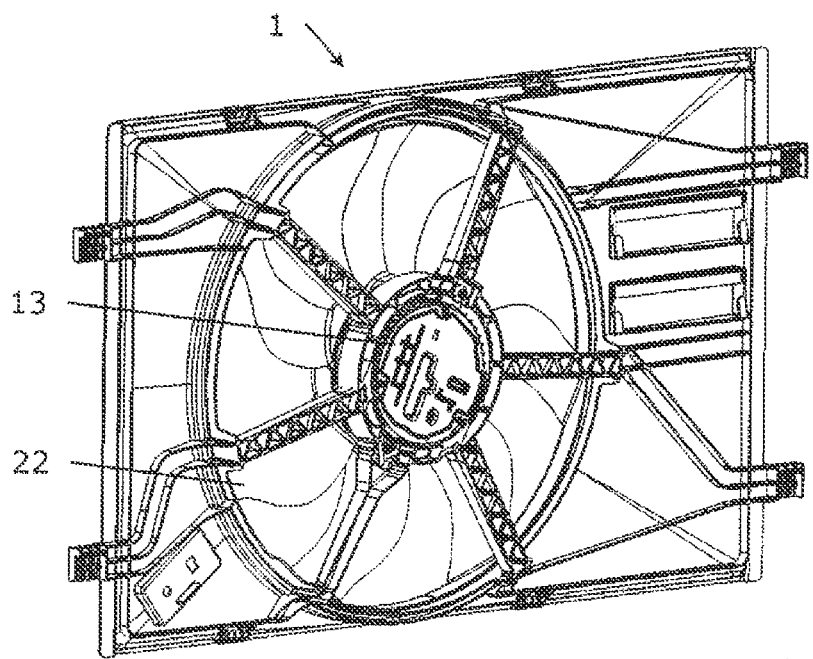
FIG. 10 is the assemblies of FIG. 9 in a situation after assembly.

The second and third preferred embodiments described require a substantially smaller tilting of the electric motor on installation than the first preferred embodiment. As a result these embodiments are particularly suitable if the electric motor 13 with pre-mounted impeller wheel 22 is to be inserted in the retaining structure 1. This is shown schematically in FIGS. 9 and 10. A smaller tilt angle requires less clearance between the outer edge of the impeller wheel 22 and the adjacent spokes 2 of the retaining structure 1.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art

LIST OF REFERENCE NUMERALS

Retaining structure 1
Spokes 2
Recesses 3, 4, 5, 6, 7
Pegs 8, 9
Stops 10, 11
Fan 12
Electric motor 13
Housing 14
First tabs 15, 16
Further tabs 17, 18, 19
Impeller wheel 22
Screw 23

What is claimed is:
1. A radiator module for a motor vehicle comprising:
a retaining structure having a plurality of recesses; and
an electric motor having a housing with a plurality of tabs extending radially from the outer surface of the housing, each one of the plurality of tabs configured for insertion and receipt into a corresponding one of the plurality of recesses so as to extend therethrough and thereby detachably connect the housing to the retaining structure, the plurality of tabs including a first tab extending radially in a first direction from the outer surface of the housing, a second tab extending radially in a second direction from the outer surface of the housing, the second direction in parallel to the first direction, a third tab extending radially in a third direction from the outer surface of the housing, the third direction being opposite to the first and second directions, a fourth tab extending radially in a fourth direction from the outer surface of the housing, the fourth direction substantially perpendicular to the first, second and third directions, and a fifth tab extending radially in a fifth direction from the outer surface of the housing, the fifth direction being opposite to the fourth direction and substantially perpendicular to the first, second and third directions.

2. The radiator module of claim 1, wherein the plurality of recesses comprises:
a first recess formed having a first pocket; and
a second recess formed having a second pocket and spaced from the first recess.

3. The radiator module of claim 2, further comprising:
a first stop member provided a lowermost region of the first pocket; and
a second stop member provided a lowermost region of the second pocket.

4. The radiator module of claim 3, wherein:
the first tab is configured for insertion into the first pocket; and
the second tab is configured for insertion into the second pocket.

5. The radiator module of claim 4, wherein:
an insertion depth of the first tab into the pocket is limited by the first stop member; and
an insertion depth of the second tab into the pocket is limited by the second stop member.

6. The radiator module of claim 5, wherein:
the first stop member is configured to center the first tab into the first pocket; and
the second stop member is configured to center the second tab into the second pocket.

7. The radiator module of claim 1, wherein the plurality of recesses comprises a third recess, a fourth recess and a fifth recess.

8. The radiator module of claim 7, wherein:
the third recess has a first peg hole fit; and
a fourth recess has a second peg hole fit.

9. The radiator module of claim 8, wherein:
the fourth tab has a first peg hole extending therethrough and is configured for receipt in the third recess such that first peg hole fit is received in the first peg hole; and
a fifth tab has a second peg hole extending therethrough and is configured for receipt in the fourth recess such that second peg hole fit is received in the second peg hole.

10. A module for a motor vehicle comprising:
a retaining structure having a first recess, a second recess symmetrically arranged with respect to the first recess, and a third recess; and
a housing having a first tab extending radially in a first direction from the outer surface of the housing, a second tab extending radially in a second direction from the outer surface of the housing and symmetrically arranged with respect to the first tab, the second direction in parallel to the first direction, and a third tab having a first through hole provided therewith and extending in a third direction from the outer surface of the housing, the third direction opposite to the first and second directions, a fourth tab extending radially in a fourth direction from the outer surface of the housing, the fourth direction substantially perpendicular to the first, second and third directions, and a fifth tab extending radially in a fifth direction from the outer surface of the housing, the fifth direction being opposite to the fourth direction and substantially perpendicular to the first, second and third directions,
wherein the first tab and the second tab are configured for insertion and receipt into the first recess and the second recess, respectively so as to extend therethrough, and the third tab is configured for receipt into the third recess, to thereby detachably connect the housing to the retaining structure.

11. A method for installing an electric motor with a retaining structure, the method comprising:
providing a retaining structure having a plurality of recesses and the electric motor with a housing having a plurality of tabs extending radially from the outer surface of the housing, the plurality of tabs including a first tab extending radially in a first direction from the outer surface of the housing, a second tab extending radially in a second direction from the outer surface of the housing, the second direction in parallel to the first direction, a third tab extending radially in a third direction from the outer surface of the housing, the third direction being opposite to the first and second directions, a fourth tab extending radially in a fourth direction from the outer surface of the housing, the fourth direction substantially perpendicular to the first, second and third directions, and a fifth tab extending radially in a fifth direction from the outer surface of the housing, the fifth direction being opposite to the fourth direction and substantially perpendicular to the first, second and third directions;
manipulating the electric motor in a first position such that a first select number of the tabs are inserted for receipt into a corresponding recess of the retaining structure so as to extend therethrough;
manipulating the electric motor in a second position such that a second select number of the tabs is received by a corresponding recess of the retaining structure; and then
mechanically fastening the remaining one of the tabs to the remaining recess.

12. The method of claim 11, wherein:
the plurality of recesses comprises a first recess formed having a first pocket, and a second recess formed having a second pocket and spaced from the first recess.

13. The method of claim 12, wherein:
manipulating the electric motor in the first position comprises inserting the first tab into the first pocket and inserting the second tab into the second pocket.

14. The method of claim 12, wherein:
manipulating the electric motor in the second position comprises inserting the third tab into the third recess, the fourth tab into the fourth recess and the fifth tab into the fifth recess.

* * * * *